United States Patent
Corey

[15] 3,671,846
[45] June 20, 1972

[54] REGULATED POLYPHASE INVERTER SYSTEM

[72] Inventor: Philip D. Corey, Raleigh, N.C.
[73] Assignee: Gates Learjet Corporation, Wichita, Kans.
[22] Filed: Jan. 20, 1971
[21] Appl. No.: 107,933

[52] U.S. Cl. .................................... 321/9 A, 321/27 MS
[51] Int. Cl. .................................................. H02m 1/12
[58] Field of Search ..................... 321/9, 9 A, 27, 27 MS

[56] References Cited

UNITED STATES PATENTS

| | | | |
|---|---|---|---|
| 3,566,244 | 2/1971 | Baude | 321/9 A X |
| 3,309,600 | 3/1967 | Wellford | 321/27 MS |
| 3,129,383 | 4/1964 | Karo | 323/48 |
| 3,573,602 | 4/1971 | Jensen | 321/9 A |
| 3,297,936 | 1/1967 | Ruch | 321/27 MS |
| 3,374,396 | 3/1968 | Bell et al. | 323/66 X |

Primary Examiner—William M. Shoop, Jr.
Attorney—Richard A. Marsen

[57] ABSTRACT

An important class of polyphase inverters employ pulse width modulation in the regulation of the power output voltage level. Such inverters are generally constructed in two symmetrical sections that are interconnected by summing transformers to a common polyphase output. Shifting the relative phase between the signal sets that gate the SCR' of the respective inverter sections correspondingly modulates the width of their resultant square wave pulses. The system output voltage level is correspondingly controlled. The secondary windings of the summing transformers of the present invention are uniquely arranged and interconnected to substantially reduce the size, weight and cost of the output transformer array. Further, a four-wire three-phase inverter system is directly provided without an auxiliary transformer that was heretofor required therefor.

6 Claims, 4 Drawing Figures

INVENTOR,
PHILIP D. COREY

1 SUMMING TRANSFORMER #2 SUMMING TRANSFORMER

INVENTOR,
PHILIP D. COREY
BY
Richard A. Marsen
ATTORNEY

REGULATED POLYPHASE INVERTER SYSTEM

BACKGROUND AND SUMMARY OF THE INVENTION

Polyphase inverters that utilize pulse width modulation (PWM) techniques for system output voltage control are described in "Principles of Inverter Circuits" by B. D. Bedford and R. G. Hoft, published by John Wiley & Sons, Inc. in 1964. An inverter system of the type of the invention hereof is illustrated in FIG. 8.12. It provides a three-phase output array with three single-phase transformers in each of its two symmetrical sections. The transformers for one of the inverter sections employ single secondary windings; that of the other, two secondary windings. The phase between the gating signals of these sections is controlled in known manner to maintain the output voltage. The secondary windings are interconnected to eliminate the harmonic components below the eleventh, and their multiples, from the system output. The requisite filtering unit is thus of reasonable size, and good sinusoidal power is provided.

An important drawback of prior art PWM inverters is that individual single phase transformers were used to accommodate its waveforms as they contain a strong third harmonic components ($3f_o$) of the system frequency, and its multiples ($3nf_o$). Such inverters obtained cancellation of the triplet harmonic components with a three-wire transformer output array, using no neutral connection. When a neutral terminal was required a relatively large auxiliary device had to be added. Such device was generally a three-phase transformer of the order of one-third the KVA rating of the whole inverter system.

In accordance with the present invention a three-phase shell-type output transformer provides an internal low reluctance path for the inherent third harmonic ($3nf_o$) fluxes in each PWM inverter section. Such triplet harmonic components thus are directly cancelled out in the three-phase inverter system hereof. An important advantage is that only two output transformer structures are required, one for each said symmetrical inverter section. The PWM inverters hereof are of substantially less size, weight and cost than heretofor available for comparable ratings. A further significant feature of the subject system is its arrangement of the secondary windings in the three-phase transformers, in unique combination and interconnection to cancel-out the harmonic components below the eleventh, and their multiples, in the power output and directly provide a fourth-wire neutral connection. The requirement of a neutral-restoring device is thereby obviated for the four-wire configuration. The PWM inverter systems hereof operate equally effectively as their prior art counterparts, yet incorporate reduced summing transformer structures, and provide further important advantages as set forth hereinafter.

DETAILED DESCRIPTION OF THE INVENTION

Figure 1:
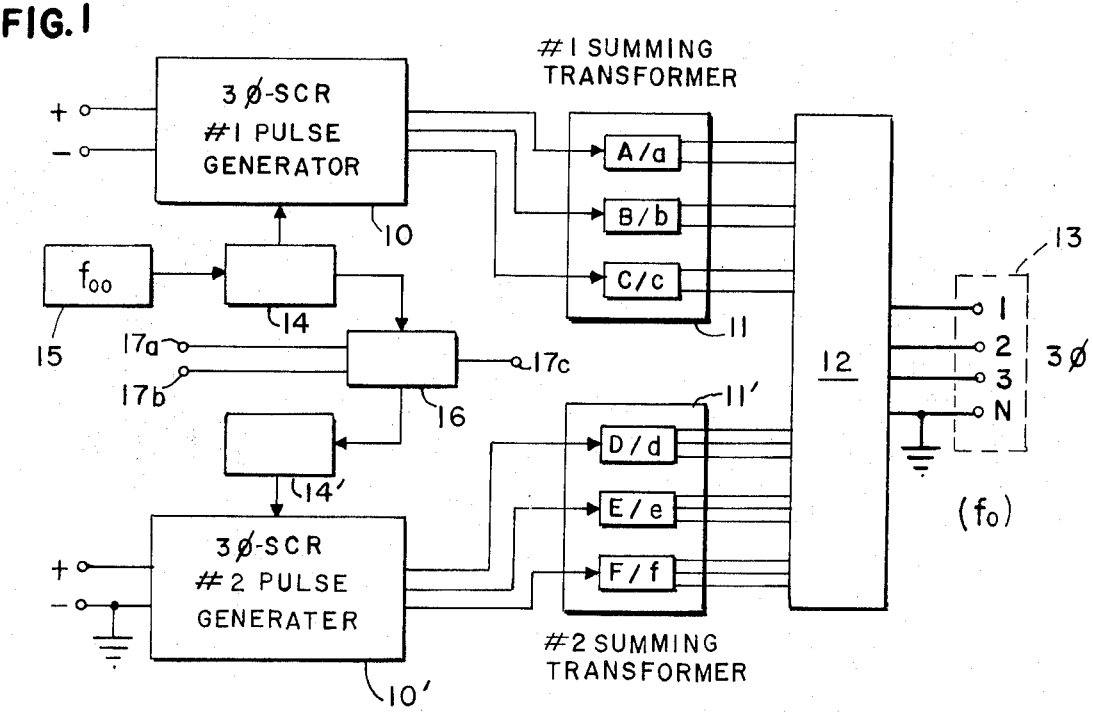
FIG. 1 is an overall block diagram of an inverter system in accordance with the present invention.

The inverter system is illustrated in block form in FIG. 1. The three-phase pulse generators are arranged as two symmetrical sections 10, 10'. The output connections of SCR generators 10, 10' are respectively connected to the primary windings of summing transformers 11, 11' in a manner to be described in detail hereinafter. The secondary windings of the No. 1 and No. 2 summing transformers (11, 11') connect into summing network 12. Network 12 also contains the system output filters. The three-phase output panel 13 has four terminals L-1, L-2, L-3, and neutral L-N.

The system is maintained at a predetermined frequency ($f_o$), such as 60 hertz, 400 hertz, etc. This frequency is established by precision clock generator 15 at frequency $f_{oo}$. The SCR gating is thereby timed in well known manner. The sequential triggering circuits for pulse generator 10 is effected by sequential unit 14, in turn controlled by clock 15. Typical gating/triggering circuitry for polyphase generators is described in U.S. Pat. No. 3,477,010. The companion three-phase SCR pulse generator 10' is similarly sequentially gated by unit 14'. The relative timing or phase position of the gating signal-set for generator 10' with respect to that for generator 10 is controlled by phase shift control unit 16. The latter is electrically tied to gating unit 14, as indicated in FIG. 1. Phase controller 16 establishes the predetermined "normal" phase displacement between the square wave output signals of generators 10 and 10' for rated D.C. source and load voltage conditions, in the manner well known in the pulse width modulation art.

Phase shift unit 16 in turn is responsive to the inverter system parameters to effect desired or necessary changes in its operation and/or output levels. Thus terminal 17a of control unit 16 is connected to an off-voltage regulator (not shown) to effect change in the phase relation of the triggering pulses delivered by unit 14' and thereby alter the relative phase of generator 10' with respect to generator 10. The resultant PWM action provides maintenance of the load voltage at terminal box 13 at the present level. Reference is made to the aforesaid text of Bedford and Hoft for principles of pulse width modulation in inverters, and its techniques. The inverter system may also be protected against significant overload in a similar way through phase shift unit 16. Towards this end, its terminal 17b is connected to a current regulator loop. An overload promptly and directly changes the phase relation of gating trigger unit 14' sufficiently to lower the load voltage to practically zero, where necessary, and thereby prevent a damaging fault in the inverter or its load.

A further system control is feasible with phase shift unit 16: When the inverter system is powered by fuel cells as its D.C. source, relatively wide voltage swings by the cells do not vary the load voltage because of the off-voltage regulation via terminal 17a. However, at times the fuel cell output may fall below a tolerable threshold voltage level which would result in faulty and even damaging inverter operation. Towards this end terminal 17c of phase shift unit 16 is made responsive to the fuel cell D.C. voltage input to inverter sections 10, 10'. When below threshold voltage occurs, the phase shifting is made sufficient to reduce significantly the output or load voltage of the system. This prevents runaway or regenerative action and permits the fuel cell to recover, whereupon normal load voltage resumes.

Figure 4:
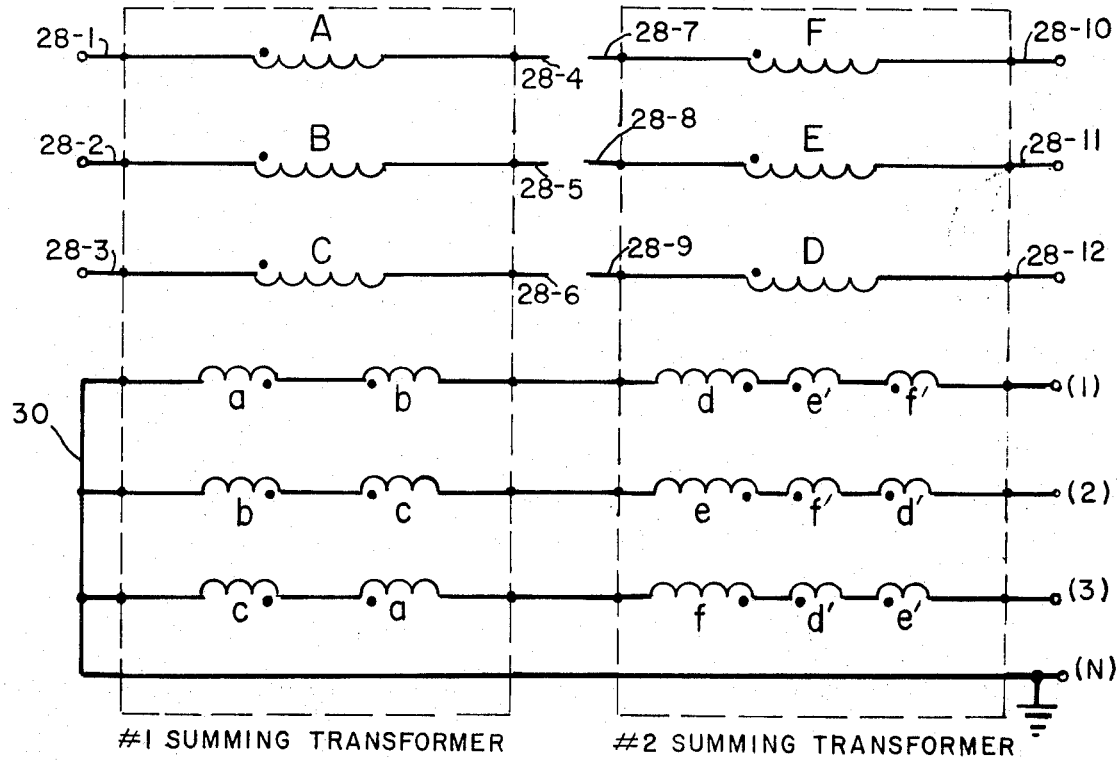
FIG. 4 is an electrical diagram of the summing transformers of the inverter system, and the exemplary interconnection of their secondary windings.

An important feature of the invention inverter system is the utilization of polyphase shell-type summing transformers (11, 11'). As hereinabove stated, the three-phase shell-type structure has been found to have low reluctance magnetic paths for the triplet harmonic fluxes through its transformer legs. This can be shown analytically, and results in the cancellation of the $3nf_o$ harmonic components in the system output. The No. 1 summing transformer (11) has three primary/secondary winding sets, as schematically indicated. A single shell-type polyphase transformer thus fully accommodates the three-phase SCR pulses from generator 10, in one magnetic structure. This replaces the three separate single-phase transformers heretofor employed in PWM inverters. The savings in cost, weight and size are substantial. Similarly, the single No. 2 summing transformer (11') for three-phase SCR pulse generator 10' is of the shell-type. The secondary windings of the two transformers 11, 11' connect to summing network 12, as illustrated in FIGS. 1 and 4.

Figure 2:
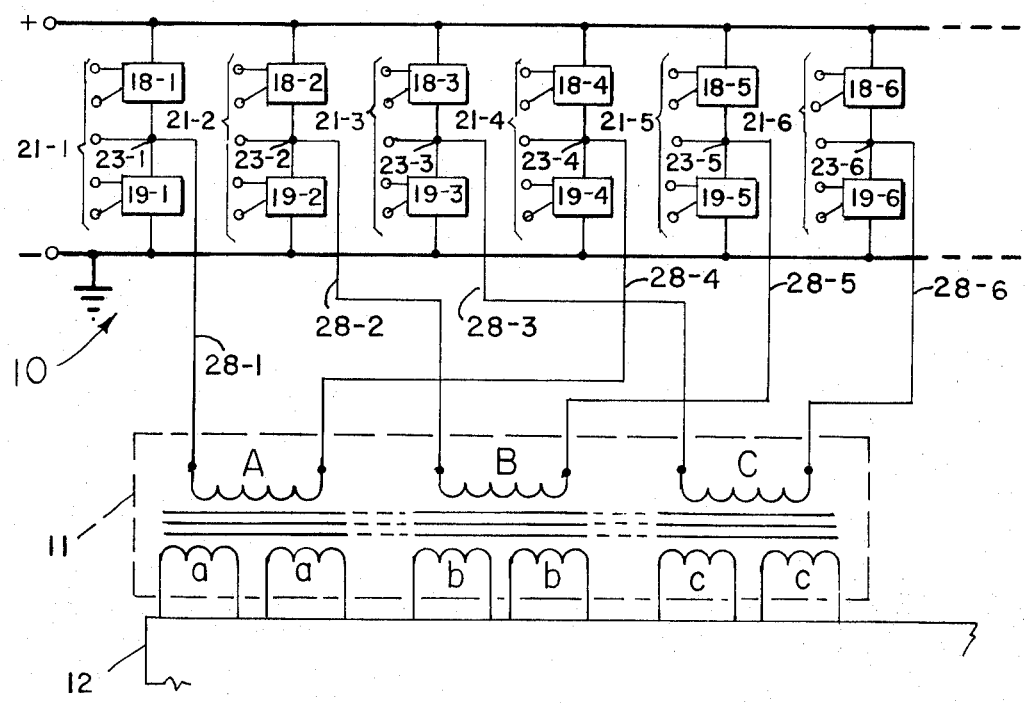
FIG. 2 is a schematic electrical diagram of a section of the inverter system hereof including its associated summing transformer.

Summing transformer No. 2 contains primary/secondary winding sets D, E, F. Further details of the exemplary windings for summing transformers No. 1 and No. 2, and their interconnection to provide the hereinabove stated advantages in the invention system are set forth hereinafter. The three-phase inputs into network 12 have their harmonic components below the eleventh, and their multiples, cancelled-out by the exemplary summing transformer arrangement. Further, a three-phase four-wire output is directly provided, including a neutral-line. FIG. 2 is a schematic electrical diagram of three-phase pulse generator 10 and its associated summing transformer 11. It is to be understood that its symmetrical No. 2 generator (10') has the same circuit configuration as generator No. 1, while summing transformer No. 2 has different secondary windings in its D, E, F phases than does transformer No. 1, as will be described.

Pulse generator 10 comprises six paired sets of SCR circuit units. The first pair is unit 18–1 and 19–1; the second, 18–2, 19–2; etc. These SCR circuit units have connections to their power SCR gates to trigger the ON conditions, together with commutation circuitry to promptly trigger them to OFF, as cycled. Such ON/OFF triggering/gating control of the power SCRs is not part of the present invention, being well known in the inverter art. Terminal sets 21–1, 21–2, etc to the SCR pairs are connected to gating-sequential triggering unit 14 in well known manner. Reference is made to the hereinabovesaid patent, by way of example. The triggering relation of each SCR pair (as 18–1, 19–1) is 180° apart. Thus the power SCR of unit 18–1 conducts for one-half cycle while that of unit 19–1 is quiescent; and the companion power SCR of 19–1 is ON for the next half-cycle, in the opposite phase while unit 18–1 is OFF.

The output lead 28–1 from the first pair 18–1, 19–1 connects from their mid-point 23–1. Similarly, the other SCR unit pairs of inverter section 10 have output lead 28–2 from mid-point 23–2; lead 28–3, from mid-point 23–3; etc. Paired inverter leg output leads 28–1, 28–3, etc directly connect to the primary windings A, B, C of associated summing transformer 11, as shown in FIG. 2. Primary winding A is connected between leads 28–1 and 28–4; primary winding B, between leads 28–2 and 28–5; and primary winding C, between leads 28–3 and 28–6. Such connections correspond to typical PWM primary winding circuitry in inverter sections; see for example FIG. 8.12 of the said text. The phase relationship of inverter lead 28–1 to 28–4, for primary winding A, is 180° apart. The inverter legs or paired units in the three-phase system are 120 electrical degrees apart.

Thus second inverter pair 18–2, 19–2 is triggered to operate 120° apart from the corresponding gating of first inverter pair 18–1, 19–1; while third inverter pair 18–3, 19–3 is triggered 120° behind that of the second inverter pair, and correspondingly 240° behind the first inverter pair, in known manner. Their counterpart inverter pairs 18–4, 19–4, 18–5, 19–5 and 18–6, 19–6 are gated 180° behind their respective first three pairs. The gating signals are under the control of sequencing units 14, 14' and for the exemplary SCR square wave generator 10 have the following phase relationships at the SCR circuit units: 18–1 at 30°; 18–2 at 150°; 18–3 at 270°; 18–4 at 210°; 18–5 at 330°; 18–6 at 90°; their counterpart SCR parts for inverter 10', as follows: 19–1 at 210°; 19–2 at 330°; 19–3 at 90°; 19–4 at 30°; 19–5 at 150°; 19–6 at 270°. At this juncture it is stated that companion SCR square wave generator 10' (see FIG. 1), has an identical circuit for its six SCR pairs, and their corresponding SCR output leads are 28–7, 28–8 etc. Reference is made to FIG. 4 for connection of the transformer No. 2 primary windings D, E, F with leads 28–7 through 28–12, which windings are connected like windings A, B, C of transformer 1 to their respective inverters 10, 10'.

Figure 3:
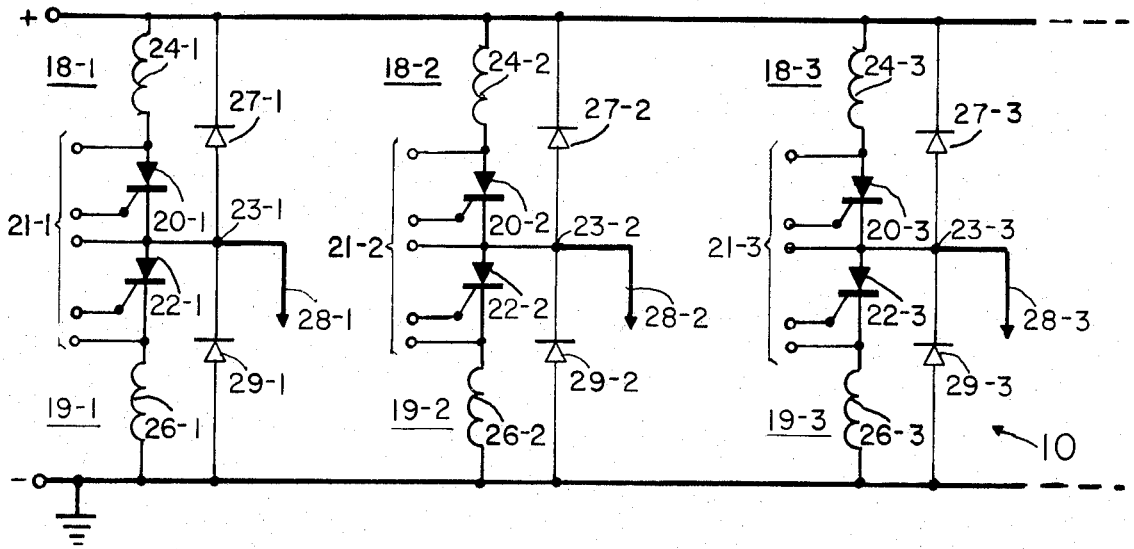
FIG. 3 is a circuit diagram of the power SCR units of the inverter.

The phase relationship amongst corresponding SCR circuit units within the inverter section 10' identically correlate with that set forth for section 10 hereinabove. In the exemplary inverter the phase separation between sections 10 and 10' for "-normal" system operation parameters may be set at 30°. A different phase difference may of course be used. FIG. 3 is a circuit diagram of a portion of inverter section 10. SCR unit 18–1 is seen to comprise power SCR 20–1 in series with commutation inductor 24–1 between mid-point 23–1 and the positive D.C. bus (+). Diode 27–1 is provided for reactive load current return, and connects across SCR 20–1 and inductor 24–1, being directly between its output line 28–1 and the positive bus. A similar diode 29–1 connects across mid-point line 28–1 and the negative bus (−). Free-wheeling diodes 27–1 and 29–1 serve also to dampen out high frequency transients that may be induced when reactive load current is abruptly switched to diode 27–1 or 29–1.

Companion power SCR 22–1 is in series with associated commutation inductor 26–1 between mid-point 23–1 and the negative bus. Terminal set 21–1 connects to the triggering circuitry of unit 14 (FIG. 1) to effect the requisite ON and OFF actions for respective power SCR' 20–1, 22–1. The signals supplied to terminals 21–1 are individual pulses of sufficient magnitude, duration and waveform for positive and rapid triggering the SCR' to ON and OFF. It is noted that a commutation capacitor (not shown) is associated with each SCR pair, as 20–1, 22–1. Also, a separate commutating SCR is provided for each power SCR, as 20–1, 22–1, 20–2, etc. Practical gating and commutation circuitry for the power SCR' of inverter sections 10 and 10', and their sequential triggering is extant, and detailed in the aforesaid patent, as well in copending patent application for "Commutation Circuit For Power Inverters," Ser. No. 868,191, filed Oct. 21, 1969, and assigned to the assignee hereof.

In the exemplary inverter system, one of the summing transformers (11) contains two secondary windings with each of its primary winding A, B, C, as follows: primary A has secondaries $a$, $a$; B has secondaries $b$, $b$; C has secondaries $c$, $c$; see FIGS. 2 and 4. The other three-phase summing transformer (No. 2) contains three secondary windings with each of its primary windings D, E, F, as follows: primary D has secondaries $d$, $d'$, $d'$; E has secondaries $e$, $e'$, $e'$; F has secondaries $f$, $f'$, $f'$. The exemplary associated primary/secondary windings A, $a$, $a$; B, $b$, $b$; etc are wound together in the shell-type magnetic structure described above and illustrated at 11, 11' in FIG. 1.

The secondary windings are uniquely connected into a three-phase wye-configuration, per FIG. 4. Line (1) has in series, windings $a$, $b$, $d$, $e'$, $f'$; line (2), windings $b$, $c$, $e$, $f'$, $d'$; line (3), windings $c$, $a$, $f$, $d'$, $e'$ . . . all in the winding phase relationship as indicated by the coded dots (FIG. 4). All secondary windings of transformer 11 have a like number of turns; while those of transformer 11' do not.

In accomplishing the purposes of the present invention, transformer 11' has three secondary windings in each phase; one of which has twice the number of turns as the other two in each phase. The number of turns of the No. 1 secondaries is ($\sqrt{3} \div 2$) or 0.866 that of the larger No. 2 windings. In the exemplary inverter the primary windings of both transformers 11, 11' each had 40 turns; the No. 1 secondaries ($a$, $b$, $c$) had 19 turns; the larger No. 2 secondary windings ($d$, $e$, $f$) had 22 turns; and the smaller no. 2 secondary windings ($d'$, $e'$, $f'$) had half as many, or 11 turns.

The effective real-time summation of the respective voltages appearing across the secondary windings at the respective three lines (1), (2), (3) provide the aforesaid harmonic component cancellation both line-to-line and line-to-neutral. This can be demonstrated by analytical means, and has been proven by inverter systems constructed as set forth. The number of turns selected for the primary windings, and that for the basic secondaries ($d$, $e$, $f$), relate to the inverter parameters as input and pulse voltages, and the selected load voltage output.

The summed PWM pulse outputs of inverter sections 10, 10' is a 12-step waveform, the addition of two six-step ones through the summer transformers 11, 11'. It can be analytically shown that the sum of the first two secondaries from neutral line 30, namely $a + b$, $b + c$ and $c + a$, each contains the fifth and seventh harmonic system frequency ($f_o$). Also, that the sum of the subsequent three secondary windings in each wye-leg has fifth and seventh harmonics of equal magnitude and opposing phase so as to cancel-out their interior sum counterparts. As this cancellation of the fifth and seventh harmonics occurs in each wye-leg (1), (2), (3) line-to-neutral, it is similarly clear of these harmonics line-to-line.

This advantageous result is not available in prior PWM inverters, and permits the direct neutral line-N, as a four-wire three-phase system. Further, as the triplet $3nf_o$ harmonics are cancelled through the use of the shell-type transformer configuration, the first harmonic components in the output are the 11th. These latter and higher ones involved, are readily filtered out by conventional means of relatively low cost and weight. The line-to-neutral voltage that appears across lines (1) to (N) can be shown analytically to be:

$$E_{1-N} = \sqrt{3} \cdot \frac{(a-b)}{2} + \left[ e - \frac{(d+f)}{2} \right]$$

The voltage across line (2) to (N), and across (3) to (N), are similarly related to that across (1) to (N), having 120° phase separation and provide the three-phase power output.

What is claimed is:

1. A polyphase inverter system comprising:
   first and second square wave generators that are circuitally symmetrical, said generators being constructed with a plurality of paried controlled rectifiers;
   a first summing transformer having a primary winding for each phase of the system in circuit connection with its said paired rectifiers of its associate first generator, and having two secondary windings with its primary winding;
   a second summing transformer having a primary winding for each phase of the system in circuit connections with its said paired rectifiers of its associate second generator, and having
   three secondary windings with each of its primary windings;
   first and second sequential triggering signal means for determining the respective polyphase square wave generation by their associate generators;
   phase shift control means responsive to a selected system operating parameter for changing the signal phase relation between said first and second signal means and correspondingly effect the output load voltage level of the inverter system; and
   a summing network interconnecting the secondary windings among said transformers to provide the polyphase output lines for the system, the said secondary windings of the respective summing transformers being constructed and arranged to directly provide a neutral wire power output line for the system while cancelling out harmonic components in their summing action below the eleventh multiple of the system frequency.

2. A polyphase inverter system as claimed in claim 1, in which the inverter is a three-phase system at output frequency $f_o$, and the said generators provide respective square wave outputs at 120° phase separation for their associate transformers, whereby the triplet harmonic components ($3nf_o$) cancel out at the transformers.

3. A polyphase inverter system as claimed in claim 2, in which the said first summing transformer has two secondary windings with each of its primary windings, and the said second summing transformer has three secondary windings wich each of its primary windings.

4. A polyphase inverter system as claimed in claim 1, in which the secondary windings of the said first summing transformer each have substantially the same number of turns, and one secondary winding of each phase of the said second summing transformer has substantially twice the number of turns as the associated other two secondary windings thereof.

5. A polyphase inverter system as claimed in claim 4, in which the number of turns of each of said secondary windings of the said first summing transformer has approximately 0.866 times the number of turns as the said larger secondary windings of the said second summing transformer.

6. A polyphase inverter system as claimed in claim 3, in which the secondary windings of the said first summing transformer each have substantially the same number of turns, and one secondary winding of each phase of the said second summing transformer has substantially twice the number of turns as the associated other two secondary windings thereof, the number of turns of each of said secondary windings of the said first summing transformer has approximately 0.866 times the number of turns as the said larger secondary windings of the said second summing transformer.

* * * * *